United States Patent
Marwah

(10) Patent No.: US 7,747,672 B1
(45) Date of Patent: Jun. 29, 2010

(54) METHOD AND APPARATUS USING LIGHTWEIGHT RRQ FOR EFFICIENT RECOVERY OF A CALL SIGNALING CHANNEL IN GATEKEEPER-ROUTED CALL SIGNALING

(75) Inventor: Manish Marwah, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 2055 days.

(21) Appl. No.: 10/660,938

(22) Filed: Sep. 12, 2003

(51) Int. Cl.
*G06F 15/16* (2006.01)
(52) U.S. Cl. .................. 709/200; 370/216; 379/221.04
(58) Field of Classification Search ................. 709/224, 709/223, 205, 206, 244; 370/331, 401, 216, 370/217; 455/432.1, 452.2, 555; 379/221.04
See application file for complete search history.

(56) References Cited

U.S. PATENT DOCUMENTS

| | | | |
|---|---|---|---|
| 6,504,922 B1 * | 1/2003 | Erb ....................... | 379/221.04 |
| 6,539,237 B1 * | 3/2003 | Sayers et al. ............... | 455/555 |
| 6,628,943 B1 * | 9/2003 | Agrawal et al. ........... | 455/432.1 |
| 6,738,343 B1 * | 5/2004 | Shaffer et al. .............. | 370/216 |
| 6,771,623 B2 * | 8/2004 | Ton ........................... | 370/331 |
| 6,785,223 B1 * | 8/2004 | Korpi et al. ................ | 370/218 |
| 6,868,059 B1 * | 3/2005 | Jones et al. ................ | 370/216 |
| 6,904,277 B2 * | 6/2005 | Tsutsumi et al. ........... | 455/411 |
| 7,457,627 B2 * | 11/2008 | Knaebchen et al. ....... | 455/452.2 |
| 2003/0167343 A1 * | 9/2003 | Furuno ...................... | 709/244 |
| 2004/0190442 A1 * | 9/2004 | Lee ........................... | 370/217 |

OTHER PUBLICATIONS

International Telecommunication Union, "Packet-Based Multimedia Communications," ITU-T Recommendation H.323, Nov. 2000, ITU.
International Telecommunication Union, "Packet-Based Multimedia Communications—Annex R: Robustness Methods for H.323 Entities," ITU-T Recommendation H.323—Annex R, Jul. 2001, ITU.

* cited by examiner

*Primary Examiner*—Dustin Nguyen
(74) *Attorney, Agent, or Firm*—Sheridan Ross P.C.

(57) ABSTRACT

The present invention is directed to the recovery of a call signaling channel in connection with a realtime communication established using a packet data network. Specifically, in the event of the failure of an endpoint's current gatekeeper, this invention provides a fast mechanism for searching for an alternate gatekeeper with which the endpoint can re-establish its call signaling channel and hence can regain call service, including call features on existing calls. In accordance with an embodiment of the present invention, a lightweight registration request message is sent on the RAS channel to an alternate gatekeeper in response to the loss of an established call signaling channel, even though a keep alive signal is not then due. The lightweight RRQ message may be sent to individual gatekeepers on an alternate gatekeeper list, until a registration confirmation message is received. Alternatively, a lightweight RRQ message may be sent to all or a number of the gatekeepers on the alternate gatekeeper list simultaneously. A call signaling channel is then established between the first alternate gatekeeper to respond with a registration confirmation message, or to a selected gatekeeper where a number of gatekeepers provide an RCF message.

21 Claims, 5 Drawing Sheets

METHOD AND APPARATUS USING LIGHTWEIGHT RRQ FOR EFFICIENT RECOVERY OF A CALL SIGNALING CHANNEL IN GATEKEEPER-ROUTED CALL SIGNALING

FIELD OF THE INVENTION

The present invention is directed to a method and apparatus for efficiently recovering an Internet protocol realtime data communication signaling channel.

BACKGROUND OF THE INVENTION

Packet data networks are increasingly used for the exchange of realtime audio, video and data communications. The H.323 protocol requires the establishment of a call signaling channel that is separate from the bearer channel. The call signaling channel is used to exchange signaling messages, such as call setup, tear down, address translation and messages related to billing.

In a gatekeeper routed system, a call signaling channel is established between an end point or terminal and a gatekeeper. The gatekeeper is an entity that provides basic call signaling features, enhanced features, address translation, network access control and other functions. The call signaling channel between the end point and a gatekeeper must be maintained in such a system if realtime communications between the terminal and any other terminal are to occur or continue.

Alternate gatekeepers may be provided by a system in case the call signaling channel between the terminal and the gatekeeper with which the terminal was initially registered fails. However, the ability to re-establish the call signaling channel with an alternate gatekeeper is not assured. For example, one or more alternate gatekeepers may not be reachable or may be down. Accordingly, an alternate gatekeeper that is actually available must be found. One approach to locating an available gatekeeper is to attempt to re-establish a transmission control protocol (TCP) connection with each address in the alternate list, one at a time, until a gatekeeper that is actually available is found. However, attempting to establish a TCP connection with each gatekeeper in the alternate list can be an extremely time consuming process, especially when a successful connection is only established towards the end of the list. A TCP connect message could be sent to multiple gatekeepers on the address list simultaneously. Such an approach could make the process of locating a gatekeeper that is actually available faster, however, it is not particularly efficient, as it could result in the generation of excessive network traffic. Furthermore, multiple TCP connections could be established, and then all but one would need to be torn down. Accordingly, needless overhead could be generated. With respect to either of the approaches in which a TCP connection is established, following establishment of the connection, messages need to be exchanged to make sure that the terminal is still registered with the gatekeeper.

Another approach to re-establishing a call signaling channel is to use a "ping" to determine if a gatekeeper is up. However, the use of a ping for this purpose is problematic in situations where the gatekeeper is behind a firewall, as some firewalls filter out the ping message. In addition, as with approaches that seek to establish a TCP connection, additional messages would be required in order to determine if re-registration is necessary.

SUMMARY OF THE INVENTION

The present invention is directed to solving these and other problems and disadvantages of the prior art. According to the present invention, a lightweight registration request (lightweight RRQ) message is sent by an end point or terminal when a call signaling channel is lost. According to an embodiment of the present invention, the lightweight RRQ message is sent to one or more gatekeepers corresponding to addresses on an alternate call signaling address list established for the end point. Each alternate gatekeeper that receives the lightweight RRQ message sends back a registration confirmation (RCF) message. The receipt of an RCF message by the end point indicates that it is very likely that the end point will be able to establish a call signaling channel with the alternate gatekeeper(s) that sent an RCF message and indicates that the end point is still registered with the gatekeeper(s).

If the end point receives a registration rejection (RRJ) message with a reason code of "discovery required," and does not receive an RCF message from any other alternate gatekeeper, the end point can terminate efforts to immediately re-establish a call signaling link. Instead, the end point can restart the registration process from the gatekeeper discovery phase.

These and other advantages and features of the invention will become more apparent from the following discussion, particularly when taken together with the accompanying drawings.

DETAILED DESCRIPTION

Figure 1:
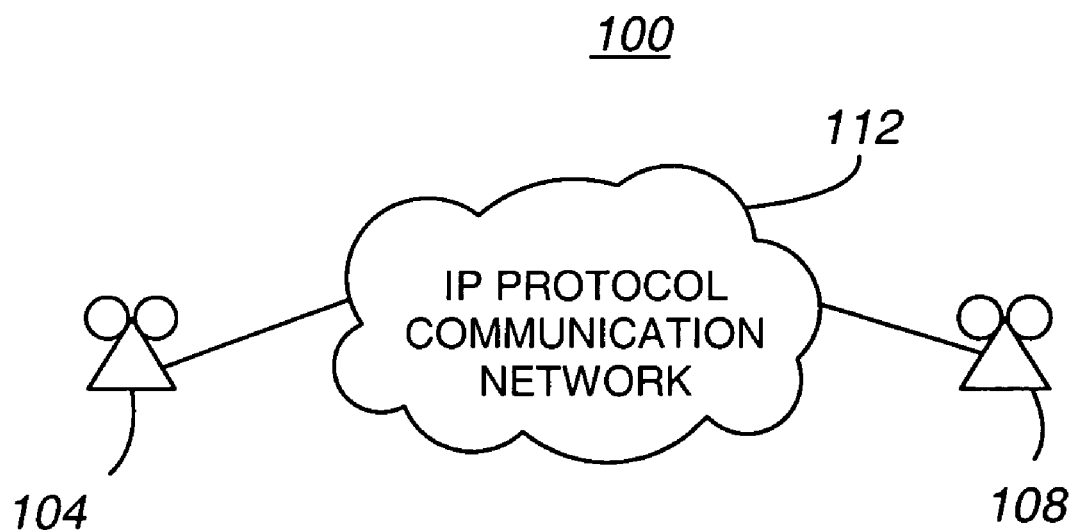
FIG. 1 depicts a realtime communication arrangement in accordance with an embodiment of the present invention.

With reference now to FIG. 1, a realtime communication arrangement 100 in accordance with an embodiment of the present invention is illustrated. In general, the communication arrangement 100 involves first 104 and second 108 communication endpoints interconnected by a communication network such as an IP protocol communication network 112. As can be appreciated by one of skill in the art, the IP communication network 112 may only comprise a portion of the communication link between a sending and receiving device. Accordingly, the endpoints 104 and/or 108 may comprise a gateway to another communication network, such as the public switched telephone network (PSTN). As can also be appreciated by one of skill in the art, where the IP protocol communication network 112 comprises the entire communication link between the endpoints 104, 108, the endpoints 104, 108 may comprise terminals. Examples of terminals include telephones, video phones or computers that are operable to provide realtime audio, video and/or data communications. Such terminals may be integrated into computing devices (e.g., a soft phone) or can be implemented as stand-alone hardware, (e.g., an IP telephone).

In accordance with an embodiment of the present invention, realtime communications between the endpoints 104, 108 across the IP communication network 112 utilize the H.323 protocol. More particularly, the present invention has application to communications in which an endpoint 104 and/or 108 utilizes gatekeeper routed call signaling in connection with realtime transfer protocol (RTP) communications.

Figure 2:
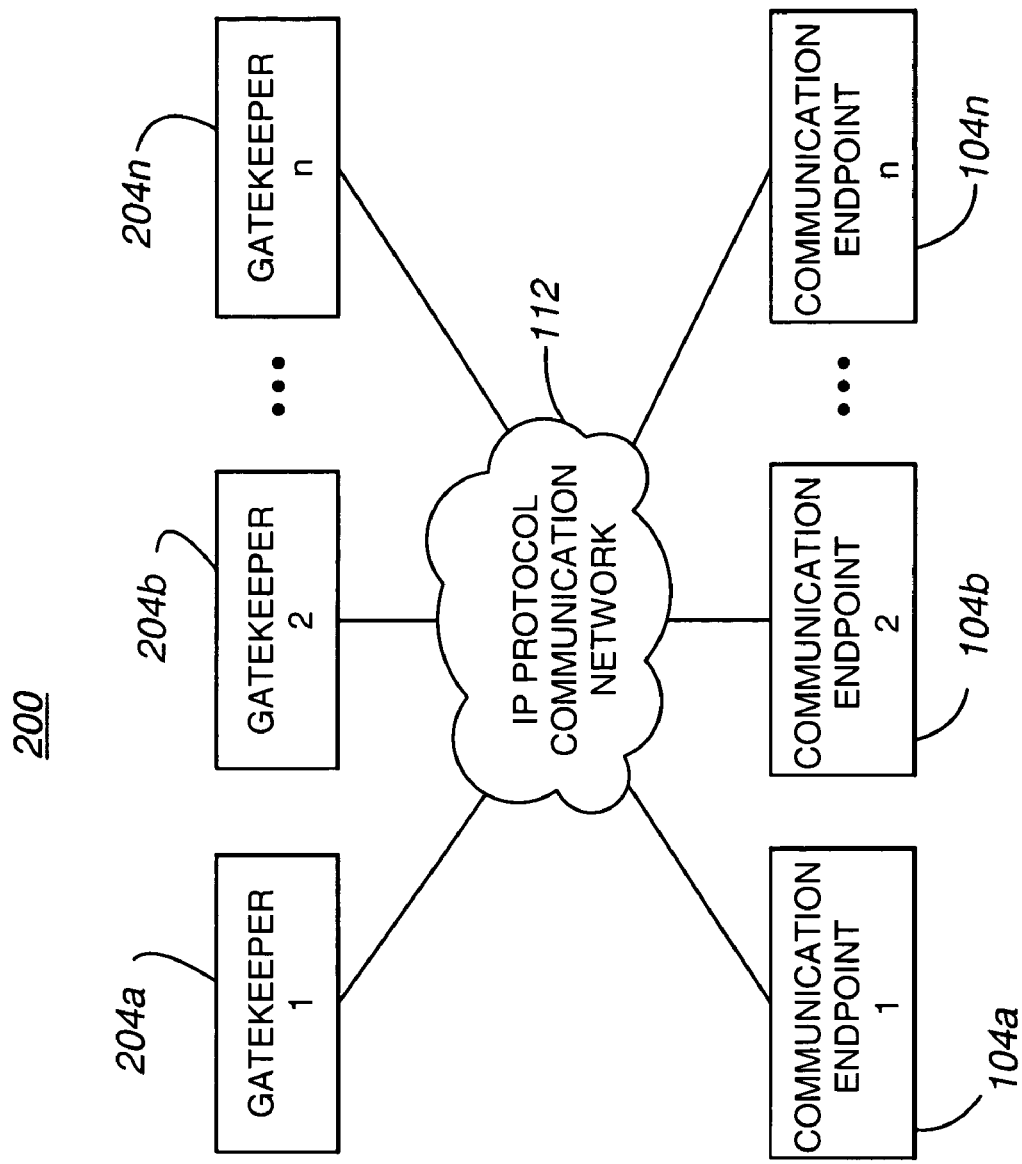
FIG. 2 depicts the relationship of gatekeepers to communication endpoints in accordance with an embodiment of the present invention.

With reference now to FIG. 2, a gatekeeper zone 200 that may be utilized in connection with a communication arrangement 100 in accordance with an embodiment of the present invention is depicted. In general, the gatekeeper zone 200 comprises a number of gatekeepers 204. In FIG. 2, gatekeeper 1 204*a*, gatekeeper 2 204*b*, and gatekeeper n 204*n* are illustrated. However, one of skill in the art can appreciate that the present invention may be applied to any zone 200 having two or more associated gatekeepers 204.

The gatekeeper zone 200 additionally includes a communication endpoint 104. In FIG. 2, communication endpoint 1 104*a*, communication endpoint 2 104*b* and communication endpoint n 104*n* are illustrated. However, a gatekeeper zone 200 having any number of communication endpoints 104, including a single communication endpoint 104, may be used in connection with the present invention.

The gatekeepers 204 and communication endpoint(s) 104 included in the gatekeeper zone 200 are interconnected by the Internet Protocol (IP) communication network 112. The communication network 112 is a packet data network that is used to establish both call signaling channels between a communication endpoint 104 and a gatekeeper 204, and a bearer channel between different communication endpoints (e.g. endpoints 104 and 108 in FIG. 1). In general, the communication network 112 comprises a local area network (LAN), wide area network (WAN) or combination of local and/or wide area networks.

Each gatekeeper 204 associated with the zone 200 provides various services to each communication endpoint 104 registered with that gatekeeper 204. For example, when a communication (e.g., a voice call) is initiated, the gatekeeper 204 with which the initiating endpoint 104 is registered will translate the address entered at the communication endpoint 104 (e.g., a dialed telephone number) into an IP address. The gatekeeper 204 also provides services such as network access control, bandwidth management, accounting functions, and communication features, such as conferencing and call waiting functions. A call signaling channel must be established between the communication endpoint 104 and a gatekeeper 204 for the duration of a realtime communication between endpoints (e.g., between endpoints 104 and 108 in FIG. 1).

The communication endpoints 104 may, as noted above in connection with FIG. 1, generally comprise a hardware or software enabled device that provides realtime audio, video and/or data communications to and/or from an Internet protocol network 112. Accordingly, a communication endpoint 104 may comprise a device that provides the content of a realtime communication directly to a user, such as a telephone or video telephone, or that provides an interconnection between the Internet protocol communication network 112 and another network, such as a public switched telephone network, and therefore functions as a gateway. The data comprising a real-time communication provided by the communication endpoint 104 is sent to or from the communication endpoint 104 over a bearer channel that is established separately from the call signaling channel. As can be appreciated by one of skill in the art, the bearer channel is typically routed to another communication endpoint (e.g. endpoint 108 in FIG. 1) without passing through a gatekeeper 204.

Figure 3A:
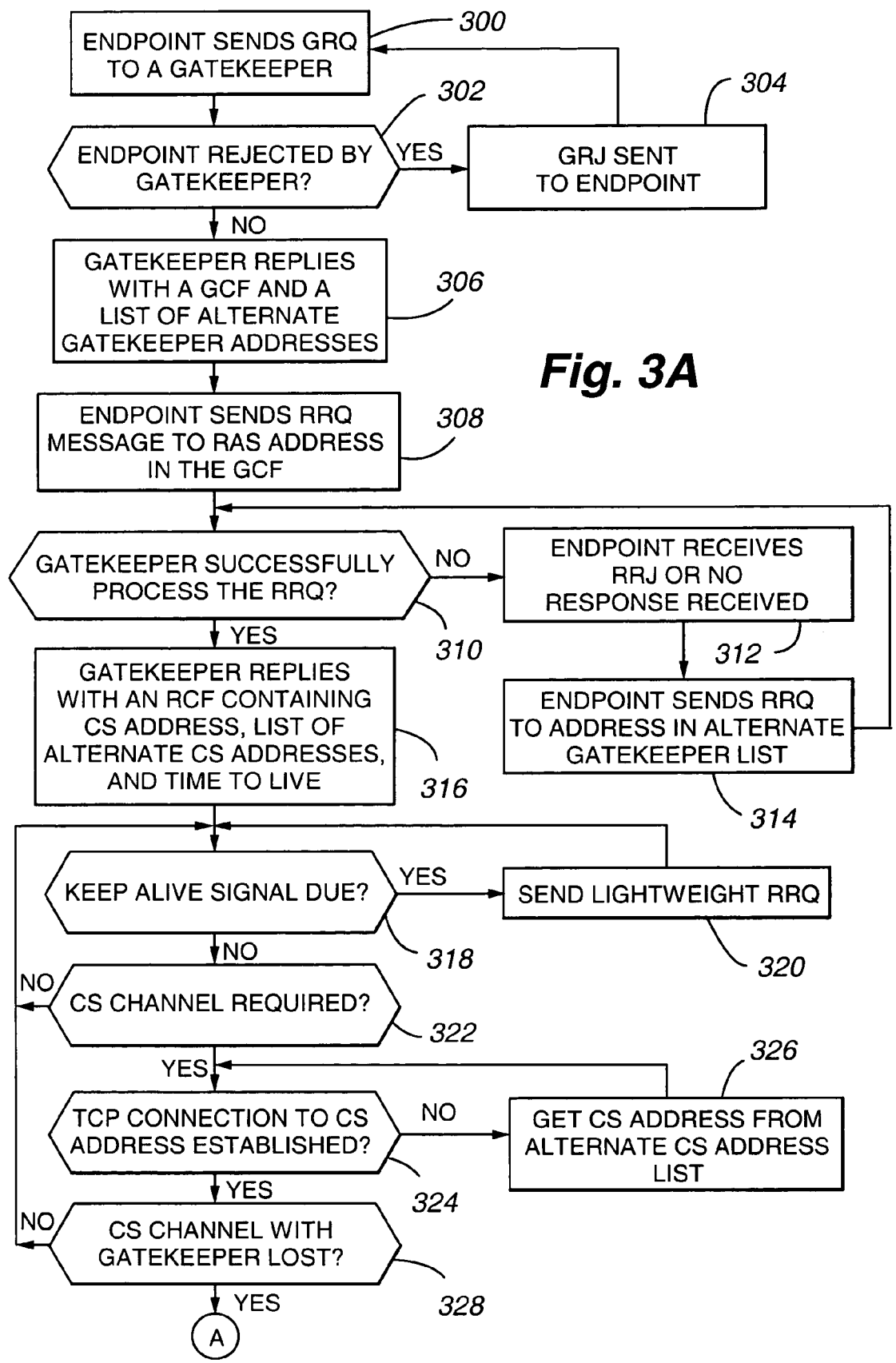
FIG. 3A is a flow diagram illustrating the discovery, registration steps and establishment of call signaling connection by an endpoint in accordance with an embodiment of the present invention.

With reference now to FIG. 3A, the gatekeeper discovery and registration procedures that may be followed and the establishment of a call signaling channel in accordance with an embodiment of the present invention are illustrated. Initially, at step 300, a gatekeeper request (GRQ) message is sent from an endpoint (e.g. endpoint 1 104*a*) to a gatekeeper 204 within the zone 200. At step 302, a determination is made as to whether the gatekeeper 204 has rejected the endpoint 104. If the gatekeeper 204 has rejected the endpoint 304, a gatekeeper reject (GRJ) message is sent to the endpoint 104 (step 304). The endpoint 104 then sends a GRQ message to another gatekeeper 204 (step 300). Alternatively, the endpoint 104 may get no response to a GRQ message, in which case the endpoint may resend the GRQ message to the same gatekeeper 204. This may be repeated several (e.g., 3) times, and if no response is received, the endpoint 104 may then send a GRQ message to the next gatekeeper 204 (step 300).

If the endpoint 104 is not rejected by the gatekeeper 204, the gatekeeper 204 replies with a gatekeeper confirm (GCF) message and a list of alternate gatekeeper addresses (step 306). The endpoint 104 then sends a registration request (RRQ) message to the registration, admission, and status (RAS) address contained in the GCF message (step 308).

At step 310, a determination is made as to whether the gatekeeper 204 has successfully processed the RRQ message from the endpoint 104. If the gatekeeper 204 was not able to successfully process the RRQ message, a registration reject (RRJ) message is sent by the gatekeeper 204. If the endpoint 104 receives an RRJ message in response to its RRQ message (step 312), the endpoint 104 sends an RRQ message to an address in the alternate gatekeeper list (step 314). If the endpoint 104 receives no response to the RRQ message (step 312), it retries several (e.g., 3) times. If still no response is received, or if a RRJ message is received, the endpoint 104 sends a RRQ message to the next gatekeeper 204 (step 314). The process then returns to step 310.

If the gatekeeper successfully processes the RRQ message, the gatekeeper replies to that message with a registration confirm (RCF) message that includes the call signaling (CS) address for the gatekeeper 204, a list of alternate CS addresses, and a time to live value specifying the periodic time interval within which the endpoint 104 must renew its registration by sending a light weight RRQ message (step 316). When the endpoint 104 receives the RCF message, the RAS channel is considered to be successfully established.

At step 318, a determination is made as to whether a keep alive signal (i.e., a lightweight RRQ message) is due. If such a message is due, a lightweight RRQ message is sent (step 320). The process then returns to step 318.

If a keep alive signal is not due, a determination is next made as to whether a CS channel is required (step 322). If a CS channel is required, for example because a user is trying to originate a call from the endpoint 104, the endpoint 104 attempts to establish a transmission control protocol (TCP) connection to the CS address received as part of the RCF message. At step 324, a determination is made as to whether the TCP connection to the CS address has been successfully established. If the TCP connection has not been established, a CS address is obtained from the alternate CS address list by the end point 104 (step 326). The endpoint 104 then attempts to establish a TCP connection to that alternate CS address, and the system returns to step 324.

After a TCP connection to a CS address has been established, the CS channel is in place. The system then determines whether the CS channel between the endpoint 104 and the gatekeeper 204 has been lost (step 328). If the CS channel has not been lost, the system returns to step 318. Although the step of determining whether a CS channel has been lost is shown as occurring at a discrete point in time, it should be appreciated that the existence of the signaling channel may be monitored by an endpoint 104 continuously.

Figure 3B:
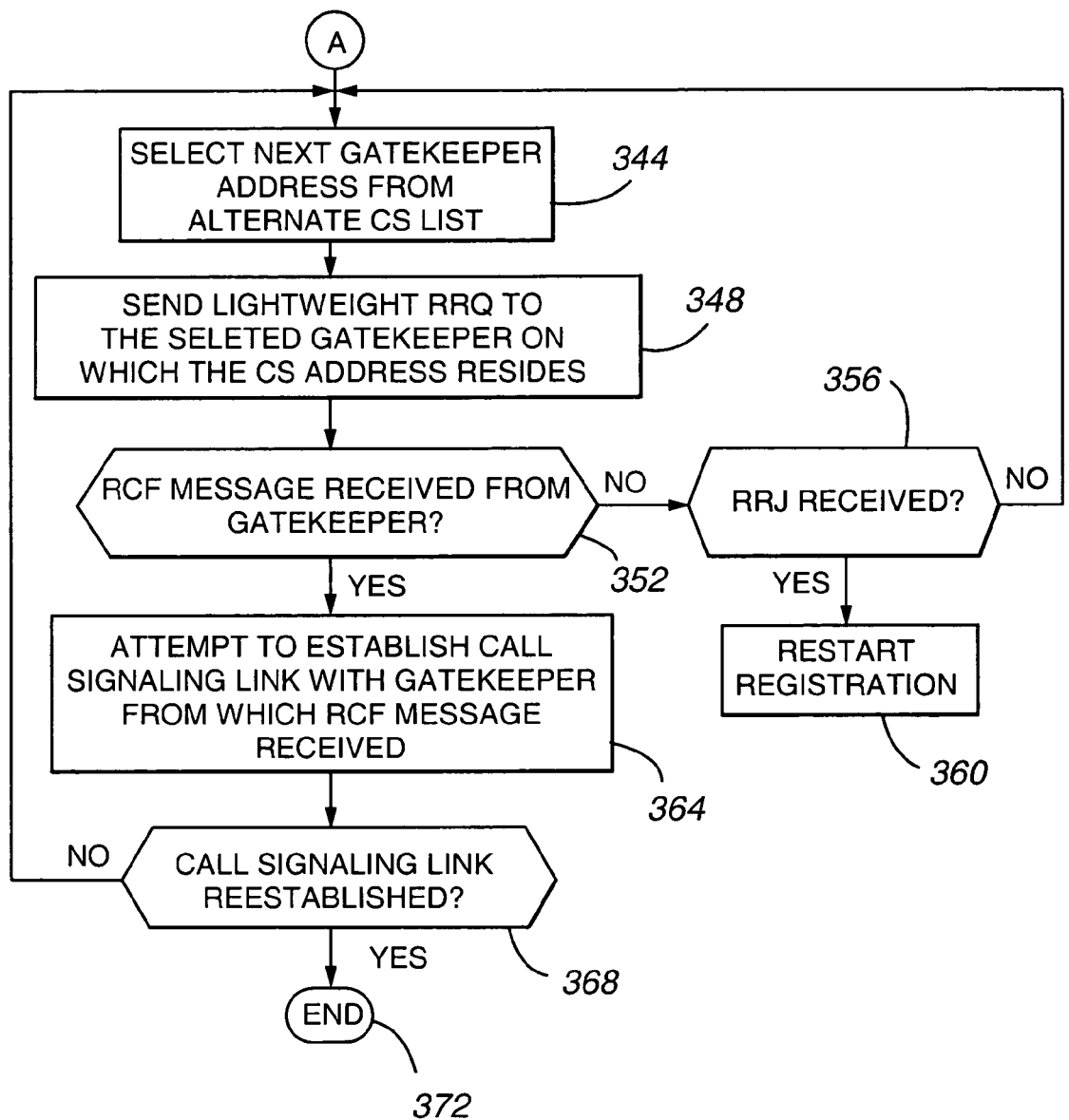
FIG. 3B is a flow chart illustrating the steps taken to re-establish a call signaling channel in accordance with an embodiment of the present invention.

With reference now to FIG. 3B, steps that may be taken to re-establish a signaling channel in accordance with an embodiment of the present invention are illustrated.

Accordingly, if at step 328 (FIG. 3A) it is determined that a call signaling channel with the gatekeeper 204 that the communication endpoint 104 had been registered with is lost, the communication endpoint 104 may proceed to step 344. At step 344, the communication endpoint 104 selects a next gatekeeper 204 from the alternate call signaling (CS) list. At step 348, a lightweight RRQ message is sent to the gatekeeper 204 on which the CS channel resides. This lightweight RRQ message is sent to a next gatekeeper 204 because the call signaling channel was lost, and not because a lightweight RRQ message was otherwise due. That is, this lightweight RRQ message is not sent as a keep alive signal. At step 352, a determination is made as to whether a response to the lightweight RRQ message, in the form of an RCF message, has been received from the gatekeeper 204. If no response is received, it is retried. If still no response is received, the communication endpoint 104 determines whether an RRJ has been received (step 356). If no RRJ is received, the communication endpoint 104 returns to step 344.

Alternatively, if the endpoint 104 receives an RRJ response from the gatekeeper 204, it implies that the endpoint 104 is no longer registered with the switch, and thus the endpoint must restart the registration process (step 360) (i.e., returns to step 300).

If an RCF response from the gatekeeper 204 is received, it is very likely that the communication endpoint 104 will be able to establish a call signaling channel with the selected gatekeeper 204. In addition, the receipt of an RCF message indicates that the communication endpoint 104 is still registered with the selected gatekeeper 204. Accordingly, if an RCF message is received from the gatekeeper 204, the communication endpoint 104 may proceed to re-establish a call signaling link with the selected gatekeeper 204 (step 364). If at step 368 it is determined that the call signaling link has been successfully re-established, the procedure for re-establishing a lost call signaling link ends (step 372). If the call signaling link is not successfully re-established, the communication endpoint 104 may return to step 344 to select a next gatekeeper 204 from the call signaling list.

Figure 3C:
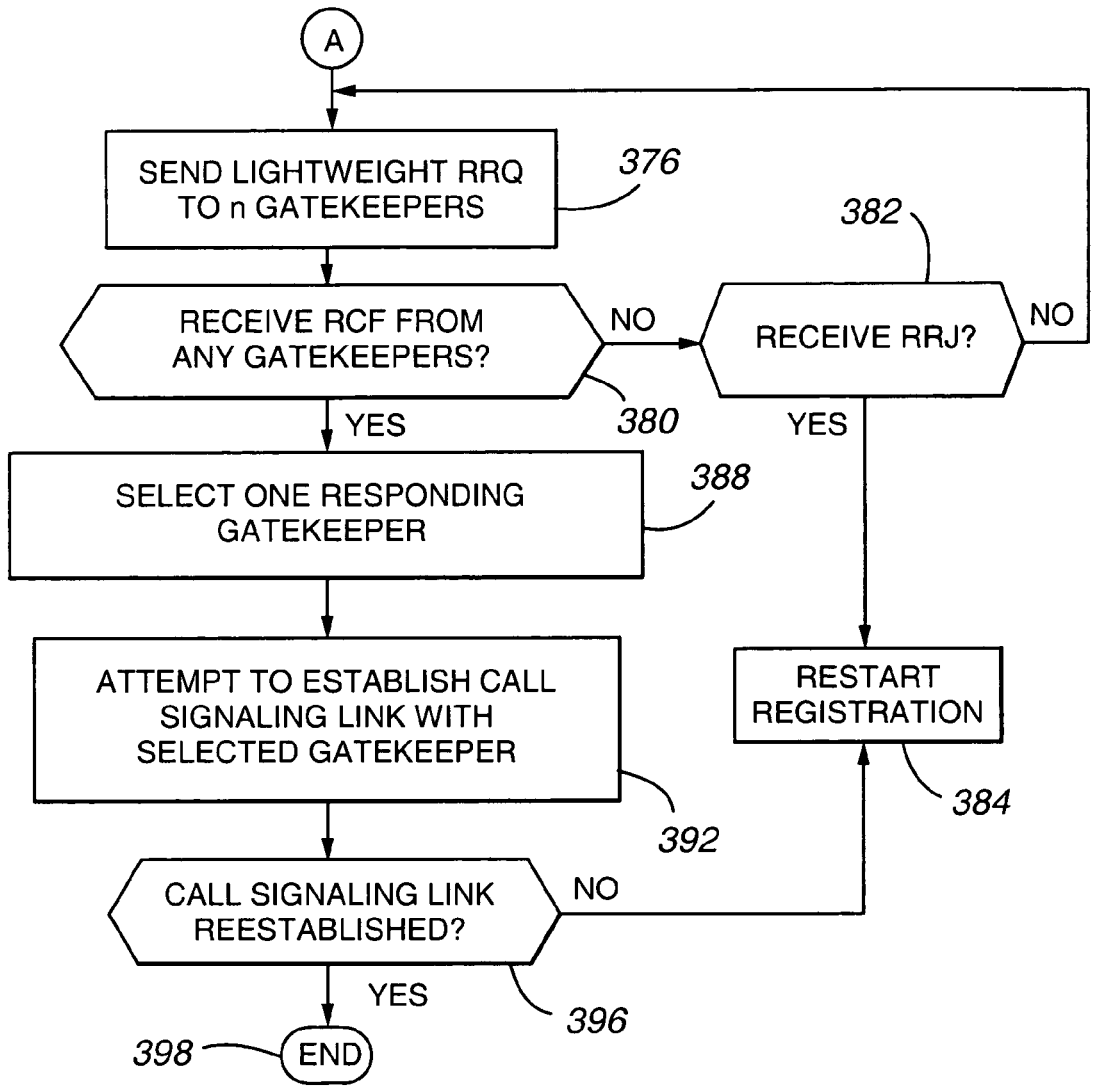
FIG. 3C is a flow chart illustrating the steps taken to re-establish a call signaling channel in accordance with another embodiment of the present invention.

With reference now to FIG. 3C, the steps taken by a communication endpoint 104 in order to re-establish a call signaling link in accordance with another embodiment of the present invention are shown. Accordingly, if at step 328 (FIG. 3A) it is determined that the signaling channel has been lost, a lightweight RRQ message is sent to n gatekeepers 204 simultaneously, where n is a number from 1 to the total number of gatekeepers 204 in the call signaling list (step 376). Where n>1, faster recovery can be realized, however, additional network traffic is generated. Therefore, n should be selected so that an improved recovery time is balanced against the amount of additional network traffic that is generated. At step 380, a determination is made as to whether a response (i.e., an RCF message) has been received from any of the gatekeepers 204. If no response has been received from any listed gatekeeper 204, the communication endpoint 104 determines whether an RRJ has been received (step 382). If no RRJ is received, the endpoint 104 returns to step 376. If an RRJ is received, the endpoint 104 can restart the registration process (step 384). If a response is received from a gatekeeper 204, one of the responding gatekeepers 204 (or the responding gatekeeper 204) is selected (step 388). At step 392, the communication endpoint 104 attempts to establish a call signaling link with the selected gatekeeper 204. A determination is then made as to whether the call signaling link has been successfully established (step 396). If the link has been successfully established, the procedure for re-establishing a call signaling link ends (step 398). If the call signaling link is not successfully established, the communication endpoint 104 may restart the registration process (step 384).

As can be appreciated by one of skill in the art, the components of a communication arrangement utilizing the present invention may be combined with other components. For example, a gatekeeper 204 may be implemented as part of a platform that provides gateway and switching capabilities. In addition, it should be appreciated that the multiple gatekeepers 204 used by embodiment of the present invention may be implemented as part of a single server computer, switch or other network entity. Likewise, a communication endpoint 104 may function as a gateway and/or a communication terminal. Furthermore, it should be appreciated that communications between terminal devices, for example a calling and a called telephone, may benefit from the present invention, even if such devices are not themselves part of a gatekeepers zone 200. In particular, so long as a segment of a realtime communication is carried over an Internet protocol network between two communication endpoints 104 (e.g. gateways), the invention may be used to provide efficient recovery of a lost call signaling channel.

It should also be appreciated that, although examples are provided in connection with use of the H.323 protocol, the present invention is not so limited. In particular, the present invention may be applied to increase the efficiency with which a call signaling channel is re-established in connection with other protocols using a keep alive signal.

In addition, it should be appreciated that the disclosed call signaling recovery mechanism is standards based, as it uses messages that are defined by the H.323 standard. Accordingly, use of the disclosed technique does not require that new messages be defined. In addition, an endpoint 104 can incorporate the disclosed recovery mechanism, without requiring that any modifications be made to the gatekeeper 204. Accordingly, any gatekeeper 204 that supports the H.323 standard can be used in connection with embodiments of the claimed invention.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or other embodiments with various modifications required by their particular application or use of the invention. It is intended that the appended claims be construed to include the alternative embodiments to the extent permitted by the prior art.

What is claimed is:

1. A method for re-establishing an IP protocol call signaling channel, comprising:
   establishing a first call signaling channel between a first communication endpoint and a first gatekeeper, wherein said first call signaling channel provides a first set of call signaling feature with respect to a first bearer channel;
   in response to losing said established first call signaling channel, sending a keep alive message to a second gatekeeper;
   if no response to the keep alive message is received, determining if a registration rejection message is received;
   if a registration rejection message is received, restarting the registration process;
   if no registration rejection message is received, sending a keep alive message to a next gatekeeper; and
   in response to receiving a registration confirmation message from said second gatekeeper in reply to said keep alive message, establishing a second call signaling channel with said second gatekeeper without restarting registration of the first communication endpoint, wherein said second call signaling channel provides said second set of signaling features with respect to said first bearer channel and effectively re-establishes said first call signaling channel.

2. The method of claim 1, wherein said keep alive message comprises a lightweight registration request.

3. The method of claim 1, wherein said step of sending a keep alive message to a second gatekeeper in response to losing said established first call signaling channel comprises sending a keep alive message to a plurality of alternate gatekeepers, and wherein said step of establishing a second call signaling channel comprises establishing a call signaling channel with a one of said alternate gatekeepers.

4. The method of claim 1, further comprising:
   in response to receiving no registration confirmation message from said second gatekeeper within a first time period, re-registering with a gatekeeper.

5. The method of claim 1, further comprising establishing a bearer channel between said first communication endpoint and a second communication endpoint, wherein said call signaling channel carries data related to at least one of control of and features associated with data transferred between said first and second communication endpoints by said bearer channel.

6. The method of claim 1, wherein said first communication endpoint comprises a telephony device.

7. The method of claim 1, wherein said call signaling channel is established according to an ITU-T H.323 protocol.

8. A communication system, comprising:
   a first communication endpoint, operable to at least one of receive data from and provide data to an Internet protocol network;
   a first gatekeeper, operable to control aspects of operation of a communication endpoint in communication with said first gatekeeper;
   a first communication link between said first communication endpoint and said first gatekeeper, wherein said first communication link provides a first call signaling channel in support of a first realtime communication;
   a second gatekeeper, operable to control aspects of operation of a communication endpoint in communication with said second gatekeeper; and
   a second communication link between said first communication endpoint and said second communication gatekeeper, wherein said second communication link is established after said first communication link is lost and after an exchange of a lightweight RRQ message and an RCF message between said first communication endpoint and said second communication gatekeeper without restarting registration of the first communication endpoint with the second gatekeeper, wherein said second communication link provides a second call signaling channel that replaces said first call signaling channel, wherein said first realtime communication formerly supported by said first call signaling channel is supported by said second call signaling channel after said first communication link is lost.

9. The communication system of claim 8, further comprising:
   a second communication endpoint; and
   a third communication link, wherein said third communication link is established between said first and second communication endpoints.

10. The communication system of claim 8, wherein said first communication endpoint comprises a telephony device.

11. The communication system of claim 10, wherein said telephony device comprises at least one of an IP telephone, a soft telephone, a videophone, and a soft videophone.

12. The communication system of claim 8, wherein said first communication endpoint comprises a gateway.

13. The communication system of claim 8, wherein said first communication endpoint comprises a first gateway and at least a first telephony device interconnected to said gateway.

14. The communication system of claim 8, wherein said first communication endpoint comprises memory operable to store an address of said second communication gatekeeper.

15. A computer readable storage medium encoded with a computer program for performing a method, the method comprising:
   registering an endpoint with a first gateway, wherein a first signaling link that supports a first bearer channel comprising a realtime communication is established between said endpoint and said first gateway;
   in response to a loss of said first signaling link, sending a lightweight registration request (RRQ) message to a second gateway; and
   if no response (RCF) to the keep alive message is received, determining if a registration rejection message (RRJ) is received; and
   if a registration rejection message (RRJ) is received, restarting the registration process;
   if no registration rejection (RRJ) message is received, sending a keep alive message (RRQ) to a next gatekeeper;
   in response to receiving a RCF message from said second gateway, establishing a second signaling link between said endpoint and said second gateway, wherein said second signaling link supports said first bearer channel comprising a realtime communication.

16. The method of claim 15, further comprising:
   in response to receiving a registration rejection message, sending a lightweight RRQ message to a third gateway.

17. The method of claim 15, further comprising:
   sending a lightweight RRQ message to a third gateway.

18. The method of claim 15, wherein said computational component comprises a logic circuit.

19. A communication system endpoint, comprising:
   means for communicating with a first means for controlling aspects of an exchange of data between said communication system endpoint and a second communication system endpoint, wherein a first call signaling channel in support of a first realtime communication over a first bearer channel is established;

means for generating a lightweight RRQ message in response to a loss of a communication link between said means for communicating and said first means for controlling aspects of an exchange of data between said communication system endpoint;

if no response to the lightweight RRQ message is received, means for determining if a RRJ message is received; and if a RRJ message is received, means for restarting the registration process;

if no RRJ message is received, means for sending a lightweight RRQ message to a next gatekeeper; and if a RCF response is received, means for interconnecting said at least a first communication endpoint means and said first means for controlling aspects of an exchange of data between said communication system endpoint, without restarting the registration process.

20. The communication system endpoint of claim 19, further comprising:

means for storing a list of alternate means for controlling aspects of an exchange of data between said communication system endpoint and a second communication system endpoint, wherein said means for generating a lightweight RRQ message addresses said lightweight RRQ message to a start of said alternate means for controlling, wherein a second call signaling channel in support of said first realtime communication over a first bearer channel is established.

21. The communication system endpoint of claim 19, further comprising:

means for storing a list of alternate means for controlling aspects of an exchange of data between said communication system endpoint and a second communication system endpoint, wherein said means for generating a lightweight RRQ message addresses a lightweight RRQ message to a plurality of said alternate means for controlling.

\* \* \* \* \*